United States Patent [19]

Tremblay

[11] Patent Number: 5,230,392

[45] Date of Patent: Jul. 27, 1993

[54] LOAD WEIGHING APPARATUS

[76] Inventor: Rémy Tremblay, 1636, Chemin St-Joseph, Chicoutimi (Québec), Canada, G7H 5A7

[21] Appl. No.: 869,749

[22] Filed: Apr. 16, 1992

[51] Int. Cl.⁵ .................. G01G 19/08; G01L 1/22; G01B 7/16
[52] U.S. Cl. ..................................... 177/137; 73/782; 338/6
[58] Field of Search .................... 177/136, 137; 338/6; 73/782

[56] References Cited

U.S. PATENT DOCUMENTS

| | | |
|---|---|---|
| 2,666,262 | 1/1954 | Ruge . |
| 2,813,709 | 11/1957 | Brier . |
| 2,899,191 | 8/1959 | Hunt . |
| 3,599,479 | 8/1971 | Kutsay .................. 338/6 X |
| 3,603,418 | 9/1971 | Schmidt . |
| 3,661,220 | 5/1972 | Harris . |
| 3,754,610 | 8/1973 | Paelian et al. . |
| 3,780,817 | 12/1973 | Videon .................. 177/136 |
| 3,857,093 | 12/1974 | Green . |
| 4,042,049 | 8/1977 | Reichow et al. .......... 177/137 |
| 4,148,369 | 4/1979 | Mercer, Jr. ............. 177/136 |
| 4,212,360 | 7/1980 | Chesher . |
| 4,333,543 | 6/1982 | Pietzsch et al. . |
| 4,581,948 | 4/1986 | Reichow . |
| 4,969,529 | 11/1990 | Reichow . |
| 5,099,700 | 3/1992 | Morin et al. ............ 338/6 X |

FOREIGN PATENT DOCUMENTS 1245677  11/1988  Canada .

*Primary Examiner*—George H. Miller, Jr.
*Attorney, Agent, or Firm*—Collard & Roe

[57] ABSTRACT

A weighing apparatus is put forward for weighing a load carried by a load support provided with front and rear wheel assemblies each having at least one member which deforms as a result of the load. The apparatus comprises a plurality of strain transducers to be affixed respectively to the members. Each of the transducers includes a pair of spaced apart brackets to be fixedly secured to the corresponding member such that their upper ends come closer to one another when the corresponding member is deformed, and an elongated load cell having opposite ends attached respectively to the upper ends of the brackets. The load cell is provided with strain sensing elements for producing an electrical strain signal indicative of a strain variation substantially along a longitudinal axis of the load cell. The apparatus also comprises a processing unit having inputs for receiving the strain signals of each of the strain sensing elements, a microcontroller for processing signals derived from the strain signals and determining thereof the load and parts of the load supported by each of the wheel assemblies, and a display unit connected to the microcontroller for displaying the determined load measures. Each of the load cells is initially subjected to a predetermined longitudinal strain when the load support is empty. When the load support is loaded, the members deform as a result of the load, bringing closer the upper ends of the pairs of brackets to one another, thereby reducing the longitudinal strain in the corresponding load cells such that the processing unit can determine and display the load and the parts of the load supported by each of the wheel assemblies.

14 Claims, 5 Drawing Sheets

LOAD WEIGHING APPARATUS

BACKGROUND OF THE INVENTION

The invention relates to weighing apparatuses for weighing loads carried by load supports such as found for example in the trucking industry, and more precisely, for weighing loads carried by any type of vehicle being provided with front and rear wheel assemblies each having at least one member which deforms as a result of the loads.

DESCRIPTION OF THE PRIOR ART

Several attempts have been made in the trucking industry to increase the profits by loading at each trip the trucks or the trailers up to the maximum load permitted by the government road and transportation regulations. Various weighing apparatuses have been evolved for that purpose.

Known in the art are U.S. Pat. Nos. 2,899,191 and 4,333,543, which describe weighing apparatuses acting and operating as platform scales. These apparatuses are intended to be set on or in the ground so vehicles pass and rest on them to get their load measured. However, such apparatuses are not easily portable and, unless installed at loading areas, cannot provide load measurements during loading. They also have to be solidly built to resist to the whole weight of the vehicle in addition to their load. Since the measurements are most frequently made once the vehicles are loaded, each vehicle's weight has to be known to calculate their effective load, requiring therefore to perform the latter operation. These drawbacks have resulted in the invention of "on-board" or integrated weighing apparatuses, to solve these problems.

Known in the art is U.S. Pat. No. 4,212,360, which describes a weighing apparatus specifically intended for a fork lift truck or the like. The apparatus requires that the load is hung from above to exert a force on a supporting element which transmits it to a load transducer. This method restricts the use of the device to this particular type of vehicle since most of the other types of vehicle support the load from below, what would require major and awkward modifications for installation.

Also known in the art are U.S. Pat. Nos. 3,603,418, 3,661,220 and Canadian patent 1,245,677, which describe weighing apparatuses especially suitable for tractor and semi-trailer combinations. The loads are directly applied to the apparatuses, which in some cases have to sustain them entirely. These apparatuses have low accuracies and their installation may be difficult to achieve (if not impractical) since they have to be set between the load supports and their wheel assemblies and/or the tractor attachments.

Also known in the art are U.S. Pat. Nos. 2,813,709, 3,780,817, 3,857,093, 4,042,049 and 4,969,529, which describe weighing apparatuses intended to be mounted onto the vehicles' suspension or axle members. Briefly, even if this kind of apparatuses experienced more commercial success than the others and has become increasingly popular in recent years, a lot of improvements remains to be done before obtaining reliable and accurate results with them. Each of these apparatuses has an accuracy which rapidly decreases in the time and requires frequent recalibrations. Therefore, they are of questionable reliability and their maintenance costs are expensive. This is, among other thing, caused by a deficiency to provide efficient and improved indicator or meter unit, as much as reliable load cells. The load cells in question operate in tension or flexion, meaning in most of the cases that the cells are at rest when no load is applied. After a few uses, plays between the cells and their support may happen, reducing the accuracy, corrupting the repeatability of the measurements and spoiling the reliability of the apparatus. The load scales of these load cells are also rather limited. The housings proposed to protect the vulnerable parts (as the sensing elements) of these apparatuses are not adapted to work conditions encountered in building or lumber site, resulting in a quick encrustation of dust and rust that affect the measurements. In addition, the presence of a worker is required near the indicator or meter unit of these apparatuses for taking load readings during loading to advise the loader to stop when the maximum permitted load is attained.

Various types of load cell (or strain transducer) such as described in U.S. Pat. Nos. 2,666,262, 3,599,479, 3,754,610 and 4,581,948 have also been evolved in the domain to provide better reading accuracy or sensitivity. However, maybe the most advantageous type of strain transducer, as described on page 20 in Mechanical Engineering Design, McGraw-Hill Inc. 1972, has been neglected in this application field. Indeed, the squared ring type of strain transducer described in the latter document has characteristics that are very attractive for the point of view of load measurement.

OBJECTS OF THE INVENTION

It is therefore an object of the present invention to provide an improved weighing apparatus for weighing a load carried by a load support, which efficiently overcomes the drawbacks of the prior art apparatuses.

It is another object of the invention to provide such a weighing apparatus, which is easy to install, simple of use and can be highly reliable for a large range of vehicle's type and load scales.

It is another object of the invention to provide such a weighing apparatus, which is adapted to hard working conditions and has a high accuracy, using a squared ring type of load cell that had never been used in this respect, and moreover and has an improved original design operates in a pre-tension initial state.

It is a further object of the invention to provide such a weighing apparatus, which provides external indications of the current load with respect to the maximum permitted one.

SUMMARY OF THE INVENTION

According to the present invention, there is provided a weighing apparatus for weighing a load carried by a load support provided with front and rear wheel assemblies each having at least one member which deforms as a result of said load, said apparatus comprising:

a plurality of strain transducers to be affixed respectively to said members, each of said transducers including a pair of spaced apart brackets to be fixedly secured to the corresponding member such that their upper ends come closer to one another when the corresponding member is deformed, and an elongated load cell having opposite ends attached respectively to said upper ends of the brackets, said load cell being provided with strain sensing means for producing an electrical strain signal indicative of a strain variation substantially along a longitudinal axis of said load cell; and a processing unit having inputs for receiving the strain signals of each of said strain sensing means, a microcontroller for processing signals derived from said strain signals and determining thereof said load and parts of said load supported by each of said wheel assemblies, and display means connected to said microcontroller for displaying said load and the parts of said load supported by each of said wheel assemblies; whereby each of said load cells is initially subjected to a predetermined longitudinal strain when said load support is empty, and when said load support is loaded, said members deform as a result of said load, bringing closer the upper ends of the pairs of brackets to one another, thereby reducing the longitudinal strain in the corresponding load cells such that said processing unit can determine and display said load and the parts of said load supported by each of said wheel assemblies.

Preferably, each of said load cells comprises an intermediate gaging portion forming a squared ring having lower and upper parallel flat surfaces, a main cylindrical stress-concentrating vertical hole centered with respect to said gaging portion, and two local stress-concentrating vertical holes aligned with the longitudinal axis of the corresponding load cell at opposite sides of said main vertical hole.

Preferably, each of said strain sensing means are four resistance strain gauges respectively mounted on said lower and upper surfaces of the corresponding gaging portion, at openings of said local vertical holes.

Preferably, each of said load cells is made of a single piece stainless alloy able to sustain a longitudinal strain up to a least 1.38 GPa.

Preferably, a plurality of airtight and waterproof housings respectively protect said load cells from outside conditions, each of said housings hermetically surrounding the corresponding load cell and being filled with elastic foam. Preferably, each of said strain gauges is sealed within the gaging portion of the corresponding load cell.

Preferably, said processing unit comprises:
input means for selecting a maximum load value to be attained, said input means having a selection output connected to a selection input of said microcontroller;
a light indicator interface for interfacing said microcontroller to an external light indicator, said light indicator interface being coupled between said microcontroller and light indicator terminals for connecting said light indicator and transmitting thereto a flashing signal indicative of a difference between said load and the selected maximum load value;
an overload indicator unit having an input for receiving an overload signal from an overload output of said microcontroller, and an output connected to a light indicator for indicating when said load exceeds the selected maximum load value.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DETAILED DESCRIPTION OF THE PREFERRED EMBODIMENTS

Figure 1:
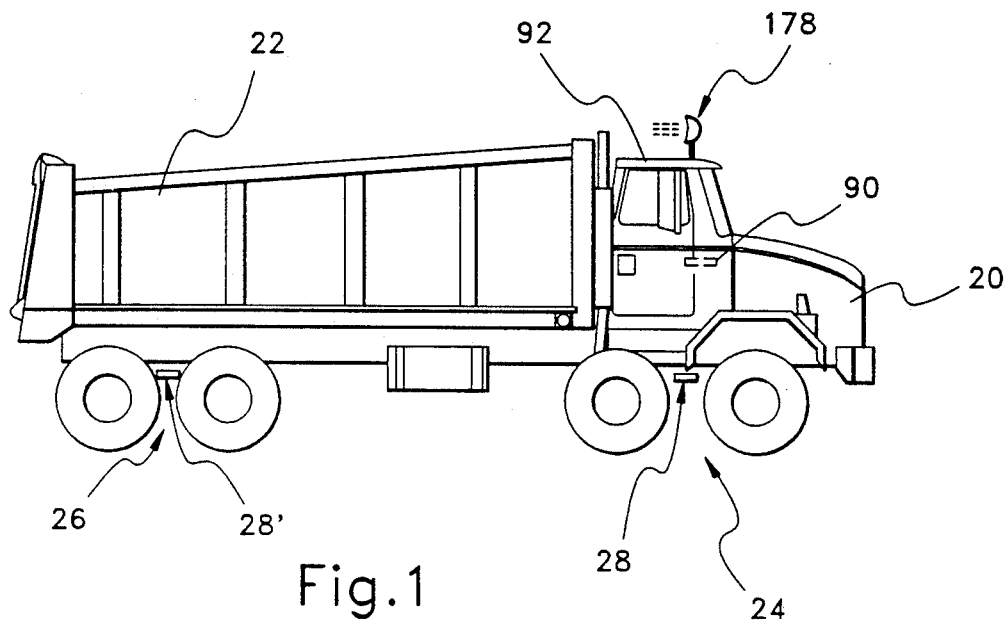
FIG. 1 illustrates a truck with a dump body acting as a load support, to which is installed a weighing apparatus according to the present invention.

The embodiments of the weighing apparatus according to the present invention that are shown in the Figures are particularly suitable for road transport vehicles such as straight trucks or semi-trailers. Hence, the following description will be made in relation with weighing apparatuses mounted on such types of vehicle, as well as with examples of the apparatus operation and use in usual conditions encountered in the trucking application field. In the following description and in the drawings, the same numerals will refer to the same elements.

Referring to FIG. 1, a straight truck 20 is equipped with a weighing apparatus according to the present invention, for weighing the load carried by its dump body 22 (acting as a load support in the meaning of the invention). The truck 20 has front and rear tandem wheel assemblies 24, 26 where are mounted strain transducers 28, 28' of the weighing apparatus in order to provide load measures with respect to each wheel assembly 24, 26 as much as the dump body 22. The application of the present invention is not restricted to such tandem wheel assemblies since the strain transducers 28, 28' can be mounted on wheel assemblies having each at least one member which deforms as a result of the load carried by the load support, in order to provide a measurable parameter leading to the load determination. Such a member can be, for example, a leaf spring or a wheel axle of the loaded vehicle, or any other convenient member as long as it deforms for the above-described reason.

Figure 4:
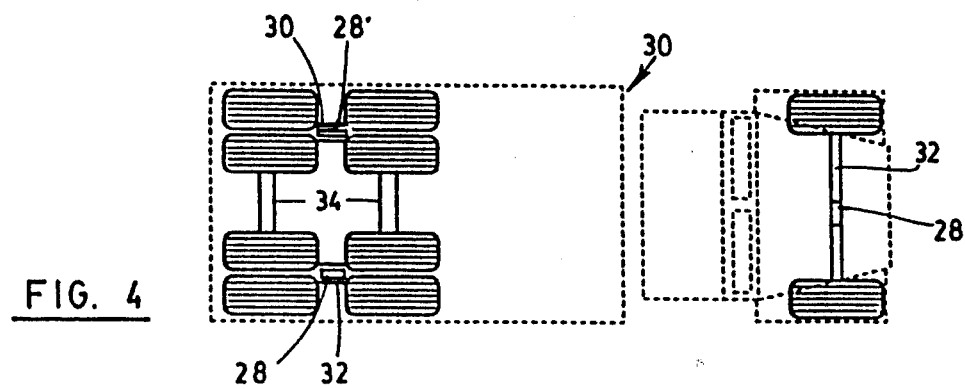
FIG. 4 illustrates the position of the load cells for a weighing apparatus installed on a ten-wheeler type of truck.

Referring to FIG. 4, for a ten-wheeler type of truck 30 having a front wheel assembly provided with a single steering axle 32, and a rear wheel assembly provided with tandem drive axles 34 mounted on leaf spring suspension, three strain transducers 28, 28' are sufficient for weighing the load and measuring its effect on each wheel assembly. A first strain transducer 28 is affixed to the steering axle 32 which bends lengthways as a function of the part of the load supported by the front wheel assembly. Preferably, this strain transducer 28 is positioned in the middle of the steering axle 32 where the deformation is greatest, in order to get the best readings possible. Second and third strain transducers 28' are affixed to the leaf springs 30, 32 between the tandem drive axles 34, on each side of the truck 30, which bend lengthways as a function of the part of the load supported by the rear wheel assembly. The installation of the strain transducers 28' on the tandem drive axles 34 would not have been proper in such case since the effect of the load on these axles 34 is almost totally inhibited by the leaf spring suspension.

Figure 5:
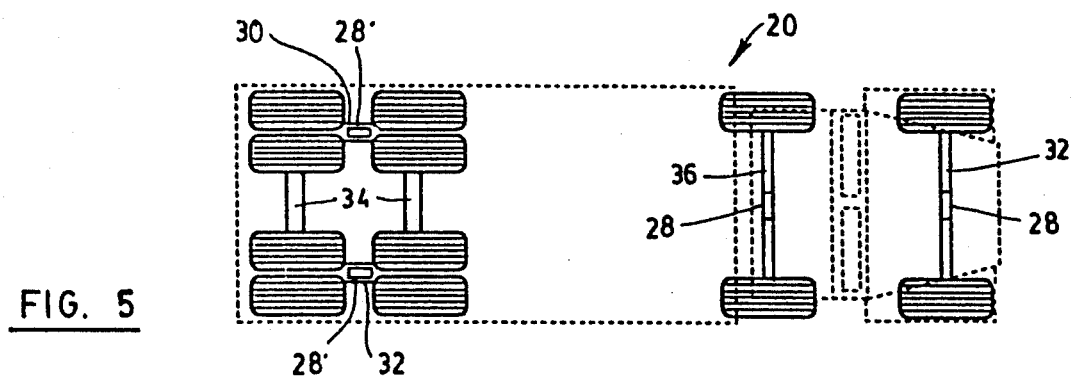
FIG. 5 illustrates the position of the load cells for a weighing apparatus installed on a twelve-wheeler type of truck.

Referring to FIG. 5, for a twelve-wheeler type of tandem-tandem truck 20 such as the one shown also in FIG. 1, the only difference with respect to the arrangement of the strain transducers 28, 28' shown in FIG. 4 resides in the addition of a fourth strain transducer 28 affixed to the second steering axle 36 in a same fashion that the first strain transducer 28 is affixed to the first steering axle 32. Although this fourth strain transducer 28 is not really essential, it increases the precision of the load reading on the front wheel assembly.

Figure 6:
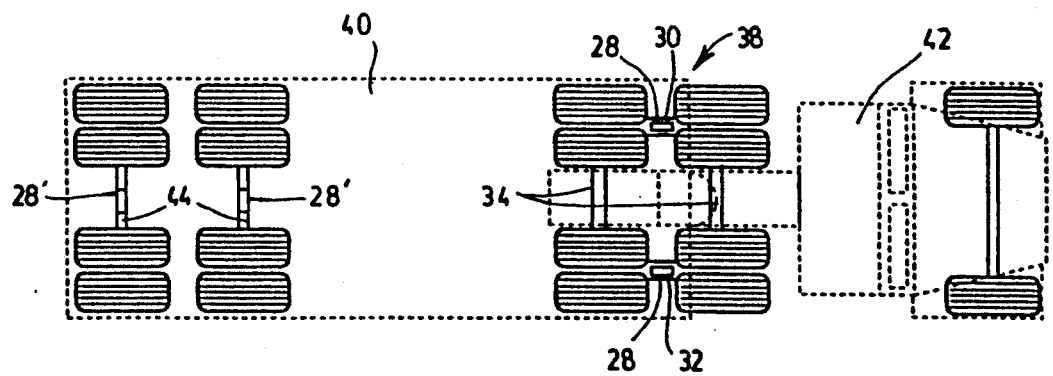
FIG. 6 illustrates the position of the load cells for a weighing apparatus installed on an eighteen-wheeler type of truck including a semi-trailer.

Referring to FIG. 6, for an eighteen-wheeler type of vehicle 38, including a semi-trailer 40 acting as a load support having a front wheel assembly provided by the tandem drive axles 34 of a fifth-wheel tractor 42, and a rear wheel assembly provided with tandem non powered axles 44, the strain transducers 28 are affixed to the leaf springs 30, 32 in a same fashion that the ones mounted on the rear wheel assembly shown in FIGS. 4 and 5, while the strain transducers 28' are affixed to the axles 44 in a same fashion that the ones of the front wheel assembly shown in FIG. 5.

Figure 2:
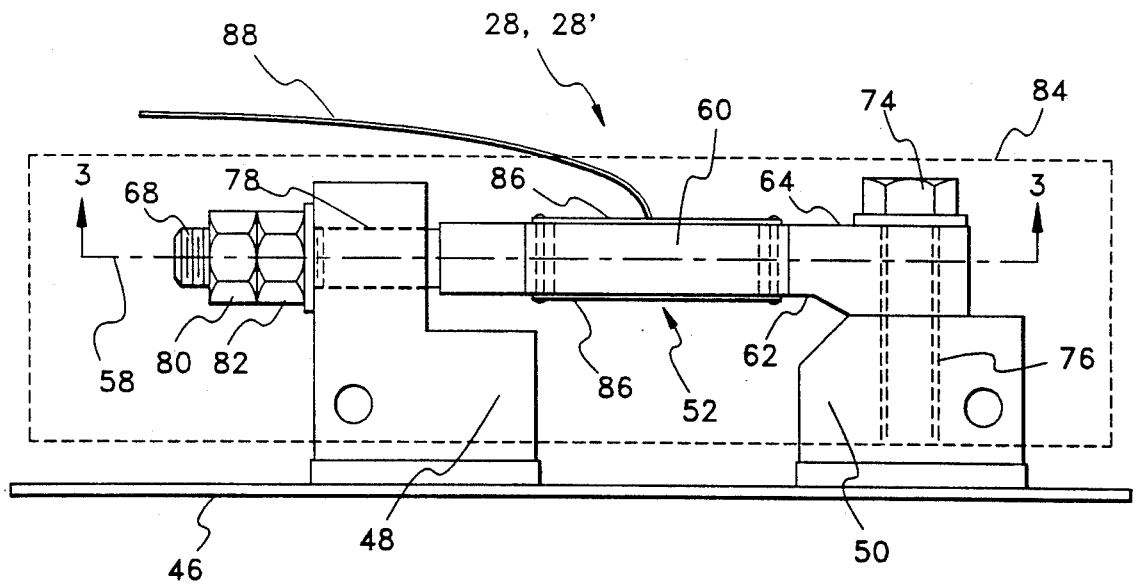
FIG. 2 illustrates an elevation view of a load cell of the weighing apparatus.

Referring to FIG. 2, each of the strain transducers 28, 28', affixed to a deformable member 46 of the corresponding wheel assembly, includes a pair of spaced apart brackets 48, 50 fixedly secured to the member 46 such that their upper ends come closer to one another when the member 46 is deformed. This is applicable, for example, for a member 46 which bends or contracts under the load. The securing may be done by soldering or by any other convenient way to that effect (bolting would also be convenient but would require the making of sockets in the member 46). Each of the strain transducers 28, 28' also includes an elongated load cell 52 having opposite ends attached respectively to the upper ends of the brackets 48, 50. The load cell 52 is provided with strain sensing elements 56 (shown in FIG. 3) for producing an electrical strain signal indicative of a strain variation along a longitudinal axis 58 of the load cell 52.

Unlike the other load cells of the prior art, which are usually at rest when the load support is empty and subjected to an elongating strain as a function of the load, the load cell 52 is rather initially subjected to a predetermined longitudinal elongating strain when the load support is empty and is subjected to a partial release as a function of the load (due to the fact that the upper ends of the brackets 48, 50 come closer to one another under the load). There is therefore no play possible between the load cell 52 and the brackets 48, 50 when the load support is empty, eliminating drift measurement errors that would otherwise possibly occurs with the prior art load cells. The reliability and the accuracy are all the more improved for the same reason.

Figure 8:
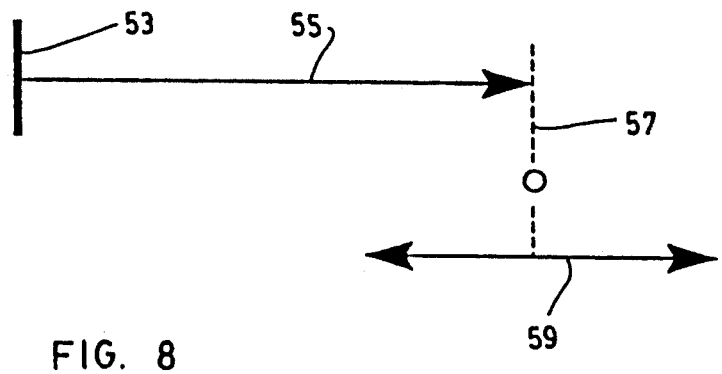
FIG. 8 illustrates a schematic diagram of the initial strain conditions on the load cells.

Referring to FIG. 8, the load cell 52 (shown in FIG. 2) is initially subjected to the predetermined longitudinal elongating strain represented by arrow 55, in a way that the strain condition of the load cell 52 is shift from a rest state position represented by vertical line 53 (which is the operating position of the prior art load cells) to a pre-tension operating position represented by vertical dotted lines 57, which comes the zero of the weighing apparatus. The zero can be adjust around the operating range represented by arrows 59, in safeness within the resilience limits of the load cell 52.

Figure 3:
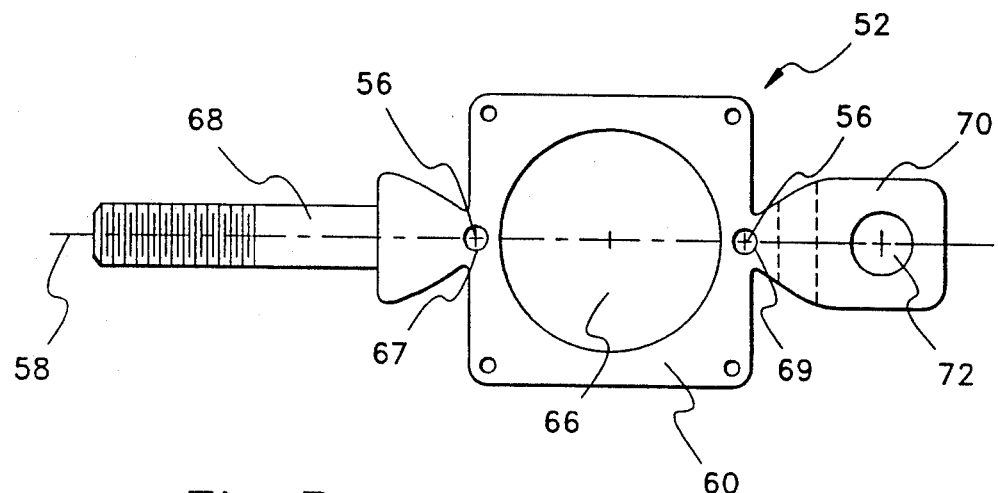
FIG. 3 illustrates a top plan view taken along line 3—3 of FIG. 2.

Referring to FIGS. 2 and 3, the load cell 52 comprises an intermediate gaging portion 60 forming a squared ring having lower and upper parallel flat surfaces 62, 64, a main cylindrical stress-concentrating vertical hole 66 centered with respect to the gaging portion 60 and two local stress-concentrating vertical holes 67, 69 aligned with the longitudinal axis 58 at opposite sides of the main vertical hole 66. Such cylindrical holes 66, 67, 69 have been proven to be one of the best form to be subjected to and to concentrate a strain, resulting in some sort of amplification which increases the accuracy of the measures made by the strain sensing elements 56. Furthermore, such a type of load cell 52 is easier and less costly to fabricate with respect to most of the prior art load cells. The load cell 52 is also provided with a rod 68 and a lug 70 respectively connected to opposite sides of the gaging portion 60 and aligned with the center axis 58. The rod 68 has a threaded ending portion allowing to bolt nuts thereto. The lug has a hole 72 in which a bolt 74 can be put through. The bracket 50 is provided with a vertical threaded socket 76 (shown in hidden lines) opening at its upper end for bolting thereto the lug 70 of the load cell 52, while the bracket 48 is provided with a longitudinal hole 78 (shown in hidden lines) at its upper end in which the rod 68 of the load cell 52 can be put through with its threaded portion sticking out for bolting thereto a pair of nuts 80, 82. This forms what can be called the adjustment side of the strain transducer 52. The load cell 52 can be therefore initially subjected to the initial predetermined strain when the load support is empty by bolting the nut 82 in abutment against the bracket 48, and then bolting the other nut 80 in abutment against the nut 82 for locking their position.

The load cell 52 formed of the gaging portion 60, the rod 68 and the lug 70, is made of a single piece stainless alloy (17-4 PH) able to sustain a longitudinal strain up to at least 1.38 GPa (160 000 PSI), with a C 35 Rockwell hardness factor.

The strain sensing elements 56 are sealed within the load cell 52 by covers 86 fixed on the lower and upper surfaces 62, 64 of the gaging portion 60. Each of the load cells 52 of the weighing apparatus is protected from outside conditions by an airtight and waterproof housing 84 (shown in dotted lines) which hermetically surrounds the corresponding load cell 52 and is filled with elastic foam to improve the protection.

The strain sensing elements 56 are four resistance strain gauges respectively mounted on the lower and upper surfaces 62, 64 of the gaging portion 60, at openings of the local vertical holes 67, 69.

Referring to FIGS. 1, 2 and 3, each of the strain sensing elements 56 is connected via a suitable cable 88 to a processing unit 90 of the weighing apparatus, which is mounted on the instrument panel in the driver cab 92 of the truck 20. Each cable 88 can be ran along the existing brake piping system (not shown in the Figures) of this type of truck 20. The cables 88 are directly connected to the processing unit 90, i.e. the cables 88 joining the strain sensing elements 56 to the processing unit 90 have no intermediate couplers or connectors, preventing the risks of defective contacts caused by vibrations or corrosion.

Figure 10:
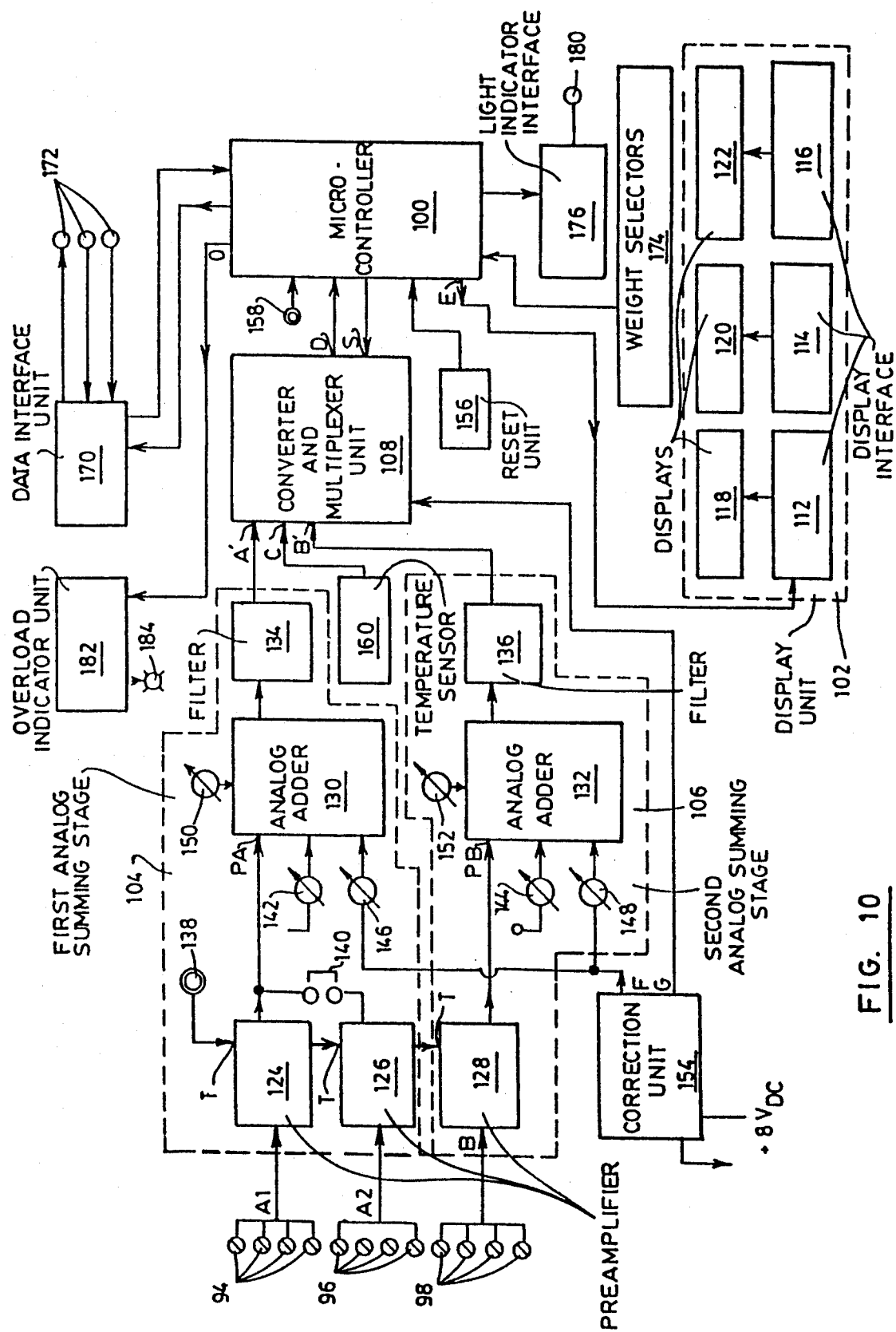
FIG. 10 illustrates an electrical bloc diagram of the processing unit of the weighing apparatus.

Referring to FIGS. 1, 2, and 3 and more specifically to FIG. 10, the processing unit 90 has inputs 94, 96, 98 for receiving the strain signals of each strain sensing elements 56, a microcontroller 100 for processing signals derived from the strain signals and determining thereof the parts of the load supported by each of the wheel assemblies 24, 26 and the load in the dump body 22, and a display unit 102 connected to the microcontroller 100 for displaying the load measures determined by the microcontroller 100.

When the dump body 22 is loaded, the members 46 deform under the load. Hence, the upper ends of the pairs of brackets 48, 50 come closer from one another, thereby reducing the longitudinal strain in the corresponding load cells 52 such that the processing unit 90 can determine and display the parts of the load supported by each of the wheel assemblies 24, 26 and the load in the dump body 22.

The inputs 94, 96, 98 of the processing unit 90 are grouped in two distinct sets: a first set A formed by the inputs 90, 92 for receiving the strain signals derived from the strain transducers 28' affixed to the members 46 of the rear wheel assembly 26, and a second set B formed by the inputs 94 for receiving the strain signals derived from the strain transducers 28 affixed to the members 46 of the front wheel assembly 24. Each of these sets can be further splitted in subsets such as the subsets A1 and A2 formed by the inputs 90 and 92 for providing to the processing unit 90 more flexibility of connecting it in several ways to various arrangements of strain transducers 28, 28'.

A first analog summing stage 104 has inputs connected to the first set of inputs 94, 96 and an output for producing a first analog sum signal A' proportional to the sum of the strain signals received by the inputs 94, 96. A second analog summing stage 106 has inputs connected to the second set B of inputs 98 and an output for producing a second analog sum signal B' proportional to the sum of the strain signals received by the inputs 98. Each of these analog sum signals A', B' are digitally converted respectively into first and second digital sum signals D by an analog-to-digital converter and multiplexer unit 108. The converter and multiplexer unit 108 has first and second inputs respectively receiving the first and second analog sum signals A', B', a select input for receiving a select signal S determining which of the analog signals is to be digitally converted, and an output for producing the digitally converted signal D. The converter and multiplexer unit 108 allows thereby the microcontroller 100 to read the digital value of the strain signals produced by the load cells 52.

The microcontroller 100 has an input connected to the output of the converter and multiplexer unit 108, a first output connected to the select input of the converter and multiplexer unit 108, and a second output for producing an encoded display signal E to be sent to the display unit 102. The encoded display signal E is indicative of the parts of the load supported by each of the wheel assemblies 24, 26 and the load in question. The microcontroller 100 forms the main control center of the whole weighing apparatus, performing the most important tasks needed for the weighing apparatus operation.

Figure 9:
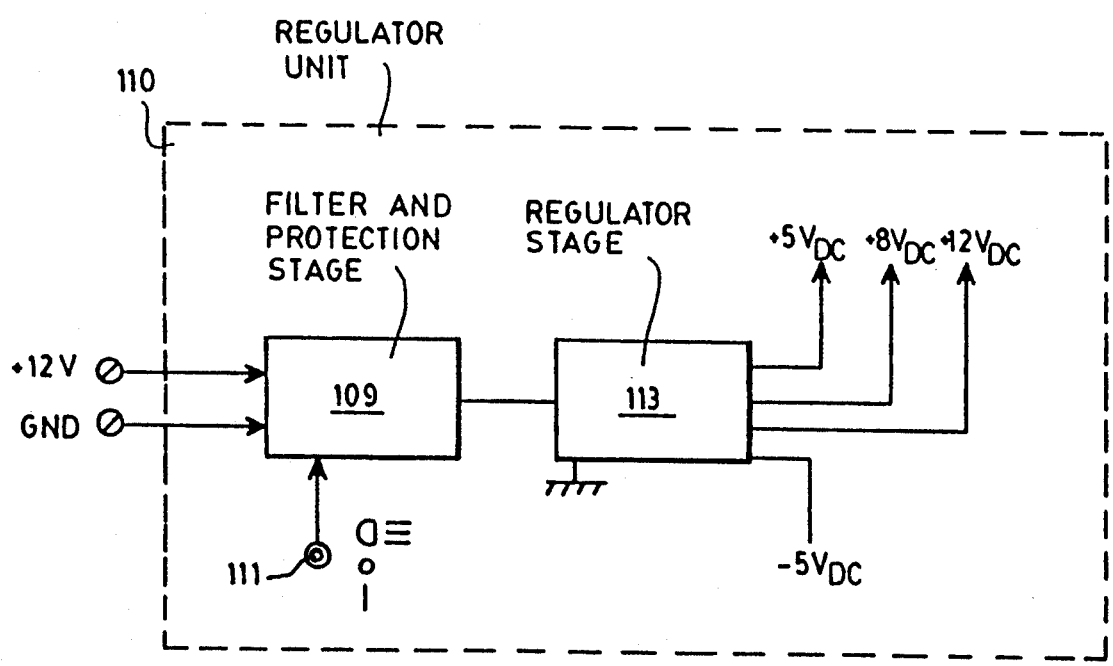
FIG. 9 illustrates an electrical bloc diagram of the regulator unit of the processing unit.

Referring to FIGS. 9 and 10, the supply of the processing unit 90 is achieved by a regulator unit 110 having an input to be connected to a +12 $V_{DC}$ supply source. In the present case, the supply source is provided by the existing battery (not shown in the Figures) of the truck 20. The regulator unit 110 also has outputs for producing DC supply signals of various voltage levels: +8 $V_{DC}$ intended to the strain sensors 56 usage; ±5 $V_{DC}$ and +12 $V_{DC}$ for the supply of the electrical components of the processing unit 90.

The regulator unit 110 includes a filter and protection stage 109 having supply inputs connected to the +12 $V_{DC}$ supply source, an activation input connected to a switch 111 for activating the regulator unit 110 and therefore the weighing apparatus, and an output for producing a filtered DC signal which is more appropriate for electrical circuitry usage. The regulator unit 110 also includes a regulator stage 113 having an input for receiving the filtered DC signal, and outputs respectively connected to the outputs of the regulator stage 110.

Referring again to FIGS. 1, 2 and more specifically to FIG. 10, the display unit 102 comprises first, second and third display interfaces 112, 114, 116 connected in cascade for respectively decoding the encoded display signal E which is first received by the first display interface 112 from the second output of the microcontroller 100. The display unit 102 also comprises first, second and third displays 118, 120, 122 for respectively displaying the parts of the load supported by each of the wheel assemblies 24, 26 and the load in question. Each of the first, second and third display interfaces 112, 114, 116 has an output connected to an input of the corresponding display 118, 120, 122.

Each of the analog summing stages 104, 106 includes at least one preamplifier stage 124, 126, 128, an analog adder 130, 132 and a filter 134, 136. Each of the preamplifier stages 124, 126, 128 has inputs respectively connected to the corresponding set A, B of inputs 94, 96, 98, a test input for receiving a test signal T from a test switch 138, and outputs for producing preamplified signals PA, PB proportional to the strain signals received by the set A, B of inputs 94, 96, 98. The gain of the preamplifier stages 124, 126, 128 are fixed once and for all to a predetermined value. The test switch 138 allows the preamplifier stages 124, 126, 128 to simulate a load in order to perform initial adjustments of the weighing apparatus with respect to the characteristics of the vehicle that will be equipped with it. Each of the analog adders 130, 132 has inputs respectively connected to the outputs of the corresponding preamplifier stages 124, 126, 128. The second preamplifier stage 126 of the first analog summing stage 104 is connected to the corresponding analog adder 130 via a jumper 140 which allows its optional use. Each of the analog adders 130, 132 also has a tare input connected to a first adjustment button 142, 144 for a manual adjustment in order to roughly adjust the zero balance of the weighing apparatus (and compensating the effects on the load cells 52 caused by their initial pre-tension state), a correction input connected to a second adjustment button 146, 148 for receiving a correcting signal F for an automatic corrected adjustment in order to adjust precisely the zero balance of the weighing apparatus and taking into account any voltage fluctuation in the signals that supply the strain sensing elements 56, a calibrating input connected to a calibrating button 150, 152 for a gain adjustment of the analog adders 130, 132, and outputs for producing the corresponding analog sum signals A', B'. Filters 134, 136 are coupled between the outputs of the corresponding analog adders 130, 132 and the inputs of the converter and multiplexer unit 108 for filtering the corresponding analog sum signals A', B' such that rapid variations in them are suppressed in order to obtain stable readings.

The processing unit 90 is also enhanced by a correction unit 154 which produces correcting signals F, G that reports the voltage situation of the supply signals that supply the strain sensing elements 56. The correction unit 154 has an input for receiving an $+8\,V_{DC}$ supply signal from the regulator unit 110, a supply output connected to the strain sensing elements 56 via the cables 88 for supplying them with the $+8\,V_{DC}$ supply signal, a first correction output for producing the correcting signal F transmitted to the analog adders 130, 132, and a second correcting output connected to a third input of the converter and multiplexer unit 108 for transmitting thereto an analog correcting signal G. This analog correcting signal G is then digitally converted by the converter and multiplexer unit 108 for its transmission to the microcontroller 100, providing the latter a way to take into account the imperfections of the electrical components of the processing unit 90 and to correct the measures accordingly.

A reset unit 156 is connected to a reset input of the microcontroller 100 and may, in addition of acting as a panic button, be used to monitor the operations carried by the microcontroller 100.

A switch button 158 connected to the microcontroller 100 allows to select one of the display modes offered by the display unit 102. The display modes are: the display of the load only; and the simultaneous display of the parts of the load carried by each of the wheel assemblies 24, 26 and the load in question.

A temperature sensor 160 has an output for producing an analog temperature signal C proportional to the temperature inside the processing unit 90. Its output is connected to a fourth input of the converter and multiplexer unit 108 for the transmission of the temperature signal C to the microcontroller 100. When the measured temperature is under $-5°\,C.$, which has been proven to be damageable for the electrical components, the microcontroller 100 prevents the operation of the weighing apparatus, thereby considerably reducing the risks of ruining it and improving its lifetime. Preferably, the temperature range of operation of the processing unit 90 should be at least between $0°\,C.$ to $70°\,C.$ A data interface unit 170 allows the microcontroller 100 to be connected to an external device such as, for example, a printer, a computer or a data acquisition system for sharing load data such as the measures of the current load in the dump body 22, with the current time and date. The data interface unit 170 is coupled between the microcontroller 100 and data input/output terminals 172 for connecting the external device.

The processing unit 90 also comprises load selectors 174 for selecting a maximum value of the load to be attained during loading. The selectors 174 have a selected load output connected to a selected load input of the microcontroller 100. A light indicator interface 176 allows the microcontroller 100 to be connected to an external light indicator 178 which can be positioned over the truck cab 92 (as shown in FIG. 1). The selectors 174 allow to determine the behaviour of the external light indicator 178. The light indicator interface 176 is coupled between the microcontroller 100 and a light indicator terminal 180 for connecting the light indicator 178 and transmitting thereto a flashing signal indicative of a difference between the current load and the maximum value of the load to be attained. Therefore, when approaching the selected maximum value of the load during loading, the flashing frequency gets from an initial high frequency to a lower frequency, until the flashing stops and a continuous light signal indicates that the maximum load has been attained. By programming the processing unit 90 to start this procedure when the current load is about 3500 Kg less than the selected maximum value, the loader can be thereby advised when to slow loading while continuing up to the optimum load, and this without any body required near the processing unit 90.

An overload indicator unit 182 has an input for receiving an overload signal 0 from an overload output of the microcontroller 100 and an output connected to a light indicator 184 for reporting in a permanent way if the load has exceeded the maximum permitted value during loading.

Figure 7:
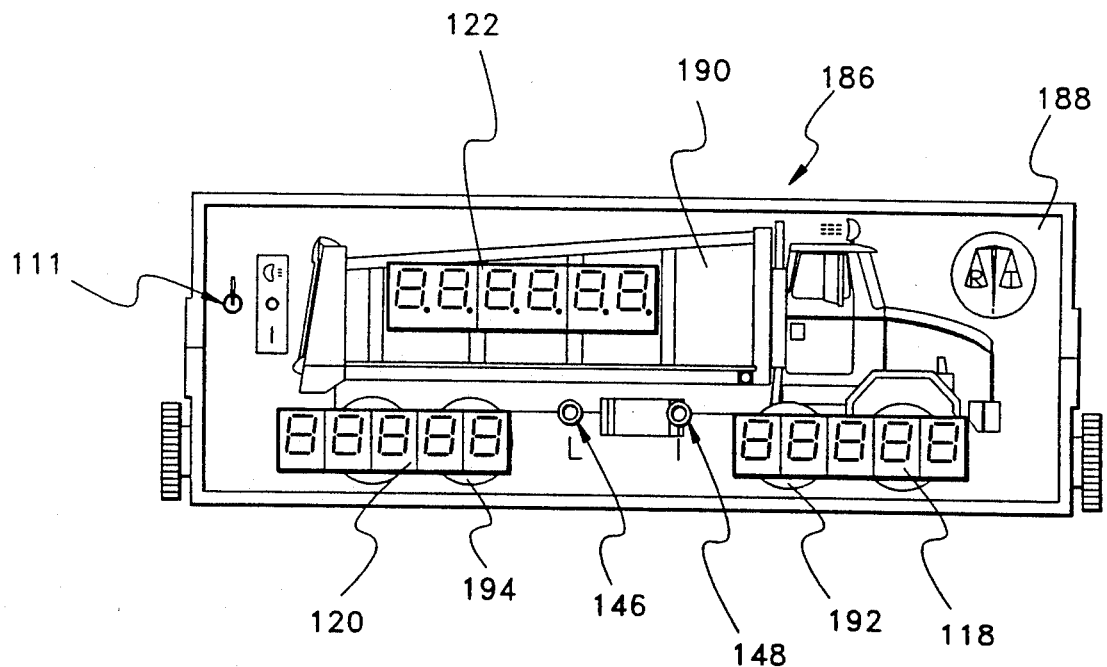
FIG. 7 illustrates the front panel of the processing unit of the weighing apparatus.

Referring to FIGS. 1 and 10 and more specifically to FIG. 7, the processing unit 90 is enclosed in a housing 186 having a front panel 188 on which pictograms 190, 192, 194 of the load support (as the dump body 22) and the front and rear wheel assemblies 24, 26 are located. The first display 118 is located on the front panel 188 near the pictogram 192 of the front wheel assembly 24 and indicates the part of the load supported by the front wheel assembly 24. The second display 120 is located near the pictogram 194 of the rear wheel assembly 26 and indicates the part of the load supported by the rear wheel assembly 26. The third display 122 is located near the pictogram 190 of the load support and indicates the load in question. Also appearing on the front panel 188 is the switch 111 for activating the weighing apparatus, and the second adjustment buttons 146, 148 allowing a user to manually bring the desired zero adjustments of the weighing apparatus.

Although the present invention has been explained hereinafter by way of preferred embodiments thereof, it should be pointed out that any modifications to these preferred embodiments, within the scope of the appended claims, are not deemed to change nor alter the nature and scope of the present invention.

What is claimed is:

1. A weighing apparatus for weighing a load carried by a load support provided with front and rear wheel assemblies each having at least one member which deforms as a result of said load, said apparatus comprising:

a plurality of strain transducers to be affixed respectively to said members, each of said transducers including a pair of spaced apart brackets to be fixedly secured to the corresponding member such that their upper ends come closer to one another when the corresponding member is deformed, and an elongated load cell having opposite ends attached respectively to said upper ends of the brackets, said load cell being provided with strain sensing means for producing an electrical strain signal indicative of a strain variation substantially along a longitudinal axis of said load cell; and a processing unit having inputs for receiving the strain signals of each of said strain sensing means, a microcontroller for processing signals derived from said strain signals and determining thereof parts of said load supported by each of said wheel assemblies and said load, and display means connected to said microcontroller for displaying said parts of the load supported by each of said wheel assemblies and said load;

whereby each of said load cells is initially subjected to a predetermined longitudinal strain when said load support is empty, and when said load support is loaded, said members deform as a result of said load, bringing closer the upper ends of the pairs of brackets to one another, thereby reducing the longitudinal strain in the corresponding load cells such that said processing unit can determine and display the parts of said load supported by each of said wheel assemblies and said load.

2. Apparatus according to claim 1, wherein each of said load cells comprises an intermediate gaging portion forming a squared ring having lower and upper parallel flat surfaces, a main cylindrical stress-concentrating vertical hole centered with respect to said gaging portion and two local stress-concentrating vertical holes aligned with the longitudinal axis of the corresponding load cell at opposite sides of said main vertical hole.

3. Apparatus according to claim 2, wherein each of said strain sensing means are four resistance strain gauges respectively mounted on said lower and upper surfaces of the corresponding gaging portion, at openings of said local vertical holes.

4. Apparatus according to claim 2, comprising a plurality of airtight and waterproof housings for respectively protecting said load cells from outside conditions, each of said housings hermetically surrounding the corresponding load cell and being filled with elastic foam, and wherein each of said strain gauges is sealed within the gaging portion of the corresponding load cell.

5. Apparatus according to claim 2, wherein:
each of said load cells is provided with a rod and a corresponding gaging portion and aligned with the center axis of the corresponding load cell, said rod having a threaded ending portion, said lug having a hole in which bolt means can be put through; and
each of said pairs of brackets has one of said brackets provided with a vertical threaded socket opening at its upper end for bolting thereto the lug of the corresponding load cell, and the other of said brackets provided with a longitudinal hole at the upper end in which the rod of the corresponding load cell can be put through with the corresponding threaded portion sticking out for bolting thereto a nut means;
whereby the corresponding load cell can be initially subjected to said predetermined longitudinal strain by bolting said nut means in abutment against the other of said brackets.

6. Apparatus according to claim 5, wherein:
said load support is a truck;
each of said pairs of brackets is soldered to the corresponding member; and
each of said members is a leaf spring or an axle of the corresponding wheel assembly.

7. Apparatus according to claim 5, wherein each of said load cells is made of a single piece stainless alloy able to sustain a longitudinal strain up to a least 1.38 GPa.

8. Apparatus according to claim 1, wherein:
said inputs of the processing unit includes a first set of inputs for receiving the strain signals derived from the strain transducers affixed to the members of said front wheel assembly, and a second set of inputs for receiving the strain signals derived from the strain transducers affixed to the members of said rear wheel assembly; and
said processing unit comprises:
a first analog summing stage having inputs connected to said first set of inputs and an output for producing a first analog sum signal;
a second analog summing stage having inputs connected to said second set of inputs and an output for producing a second analog sum signal;
an analog-to-digital converter and multiplexer unit for digitally converting said first and second analog sum signals into first and second digital sum signals respectively, said converter and multiplexer unit having first and second inputs respectively receiving said first and second analog sum signals, a select input for receiving a select signal determining which of said analog signals is to be digitally converted, and an output for producing a digitally converted signal; and
a regulator unit having an input to be connected to a DC supply source, and outputs for producing DC supply signals of various voltage levels for supplying said processing unit and said strain sensing means; and
said microcontroller has an input connected to said output of the converter and multiplexer unit, a first output connected to said select input of the converter and multiplexer unit, and a second output for producing an encoded display signal to be sent to said display means, said encoded display signal being indicative of said parts of the load supported by each of said wheel assemblies and said load.

9. Apparatus according to claim 8, wherein said display means comprises first, second and third display interfaces connected in cascade for respectively decoding said encoded display signal which is first received by said first display interface, and first, second and third display for respectively displaying said parts of the load supported by each of said wheel assemblies and said load, each of said first, second and third display interfaces having an output connected to an input of the corresponding display.

10. Apparatus according to claim 9, comprising a housing for enclosing said processing unit, said housing having a front panel on which pictograms of said load support and said front and rear wheel assemblies are located, said first display being located on said front panel near the pictogram of the front wheel assembly and indicating the part of said load supported by said front wheel assembly, said second display being located near the pictogram of the rear wheel assembly and indicating the parts of said load supported by said rear wheel assembly, and said third display being located near the pictogram of the load support and indicating said load.

11. Apparatus according to claim 8, wherein:
each of said analog summing stages includes:
at least one preamplifier stage having inputs respectively connected to said inputs of the corresponding analog summing stage, a test input for receiving a test signal from a test switch, and outputs for producing preamplified signals;
an analog adder having inputs respectively connected to said outputs of the corresponding preamplifier stage, a tare input connected to first adjusting means for a manual adjustment of said analog adder, a correction input connected to a second adjusting means receiving a correction signal for a corrected adjustment of said analog adder, a calibrating input for a gain adjustment of said analog adder, and an output for producing the corresponding analog sum signal; and
a filter coupled between said output of the corresponding analog adder and said output of the corresponding analog summing stage for filtering the corresponding analog sum signal;

and said processing unit comprises:

a correction unit having an input for receiving one of said DC supply signals from said regulator unit, a supply output connected to said sensing means for supplying said sensing means with said one of the DC supply signals, a first correction output for producing said correction signal, and a second correction output connected to a third input of said converter and multiplexer unit for transmitting thereto an analog correction signal indicative of said one of the DC supply signals;

a resetting unit connected to a reset input of said microcontroller; and switching means connected to said microcontroller for selecting a display mode.

12. Apparatus according to claim 11, wherein said processing unit comprises:

temperature sensing means having an output for producing an analog temperature signal indicative of a temperature in proximity of said processing unit, said output being connected to a fourth input of said converter and multiplexer unit; and a data interface unit for interfacing said microcontroller to an external device, said data interface unit being coupled between said microcontroller and data input/output terminals for connecting said external device.

13. Apparatus according to claim 11, wherein said processing unit comprises:

input means for selecting a maximum load value to be attained, said input means having a selection output connected to a selection input of said microcontroller;

a light indicator interface for interfacing said microcontroller to an external light indicator, said light indicator interface being coupled between said microcontroller and light indicator terminals for connecting said light indicator and transmitting thereto a flashing signal indicative of a difference between said load and the selected maximum load value; and an overload indicator unit having an input for receiving an overload signal from an overload output of said microcontroller, and an output connected to a light indicator for indicating when said load exceeds the selected maximum load value.

14. Apparatus according to claim 8, wherein said regulator unit includes:

a filter and protection stage having supply inputs connected to said input of the regulator unit, an activation input connected to switching means for activating said regulator unit, and an output for producing a filtered DC signal; and a regulator stage having an input for receiving said filtered DC signal, and outputs respectively connected to said outputs of the regulator stage, wherein said voltage levels are $\pm 5\ V_{DC}$, $+8\ V_{DC}$ and $+12\ V_{DC}$.

* * * * *